April 28, 1964     C. A. COOK     3,130,595

TRANSMISSION

Filed Dec. 29, 1960     7 Sheets-Sheet 1

INVENTOR.
CHARLES A. COOK

BY Kenneth C. Witt

ATTORNEY

April 28, 1964     C. A. COOK     3,130,595
TRANSMISSION

Filed Dec. 29, 1960     7 Sheets-Sheet 3

INVENTOR.
CHARLES A. COOK
BY Kenneth C. Witt
ATTORNEY

April 28, 1964

C. A. COOK 3,130,595

TRANSMISSION

Filed Dec. 29, 1960

INVENTOR
CHARLES A. COOK

BY Kenneth C. Witt

ATTORNEY

United States Patent Office 3,130,595
Patented Apr. 28, 1964

3,130,595
TRANSMISSION
Charles A. Cook, Jackson, Mich., assignor to Clark
Equipment Company, a corporation of Michigan
Filed Dec. 29, 1960, Ser. No. 79,437
8 Claims. (Cl. 74—331)

This invention relates to change speed power transmission mechanisms, and more particularly to such transmission mechanisms having constantly meshing gears plus clutches for selectively clutching such gears to rotatable shafts to provide the desired gear ratio between the input and output shafts of the transmission.

The present transmission is power shifted and is intended primarily for use in the propulsion of heavy duty vehicles, but it will be apparent that it is not limited to such use and may be adapted for the transmission of energy in other applications.

An object of the present invention is to provide a power shifted, change speed transmission with constantly meshing gears in which with but slight alteration in construction the output shaft may be either in alignment with the input shaft or offset from the input shaft, or there may be output shafts in both locations.

A further object of this invention is to provide a power shifted, constant mesh transmission in which it is never necessary to engage two or more clutches simultaneously in order to accomplish a change in ratio. It will be appreciated that such operation is undesirable because it increases the amount of pressurized fluid which must be supplied to fill and engage the clutches as compared to the amount which is required if only one clutch is engaged at a time, and it introduces problems of coordinating the operation of the two or more clutches.

In many uses for change speed transmissions it is desirable that the output shaft be in alignment with the input shaft and the present invention provides for such an arrangement. In other uses for such transmissions it is desirable that the output shaft be offset from the input shaft, an example of such use being a vehicle in which the engine is located in a position considerably above the drive axle or axles of the vehicle. In some vehicles it is desirable to provide four-wheel drive, and in such use particularly it is desirable to have the transmission output shaft offset below the input shaft so that it is possible readily to connect propeller shafts running both forwardly and rearwardly from the transmission. The present invention provides for all of these arrangements, and in addition provides, if desired, for having output shafts in both locations.

In carrying out my invention in one preferred form, I provide a multi-ratio, constant mesh transmission having a plurality of rotatable shafts arranged in parallel relation in a casing. Included among the shafts are an input shaft, a reverse shaft, an output shaft and a pair of intermediate shafts. Four multiple disc clutches are located respectively at the ends of the two intermediate shafts. Each of these clutches includes a hub at the shaft end carrying friction discs and additional friction discs interleaved with the discs on the hub and carried by a rotatable drum member, and provision for compressing the respective disc assemblies to selectively engage the clutches. The output shaft has a pair of gears secured thereto. A second pair of gears is secured one each to the rotatable drums at one end of the said two intermediate shafts, and a third pair of gears is secured respectively to the rotatable drums at the other ends of the intermediate shafts. Both the second and third pairs of gears are in constant mesh respectively with one of the first pair of gears on the output shaft. Selective engagement of the clutches produces any desired one of four gear ratios between the input shaft and the output shaft.

For a clearer and more complete understanding of my invention, reference should be had to the following description and the accompanying drawing in which:

FIGURE 2a is a fragmentary view along the line 2a—2a of FIG. 1;

Figure 1:
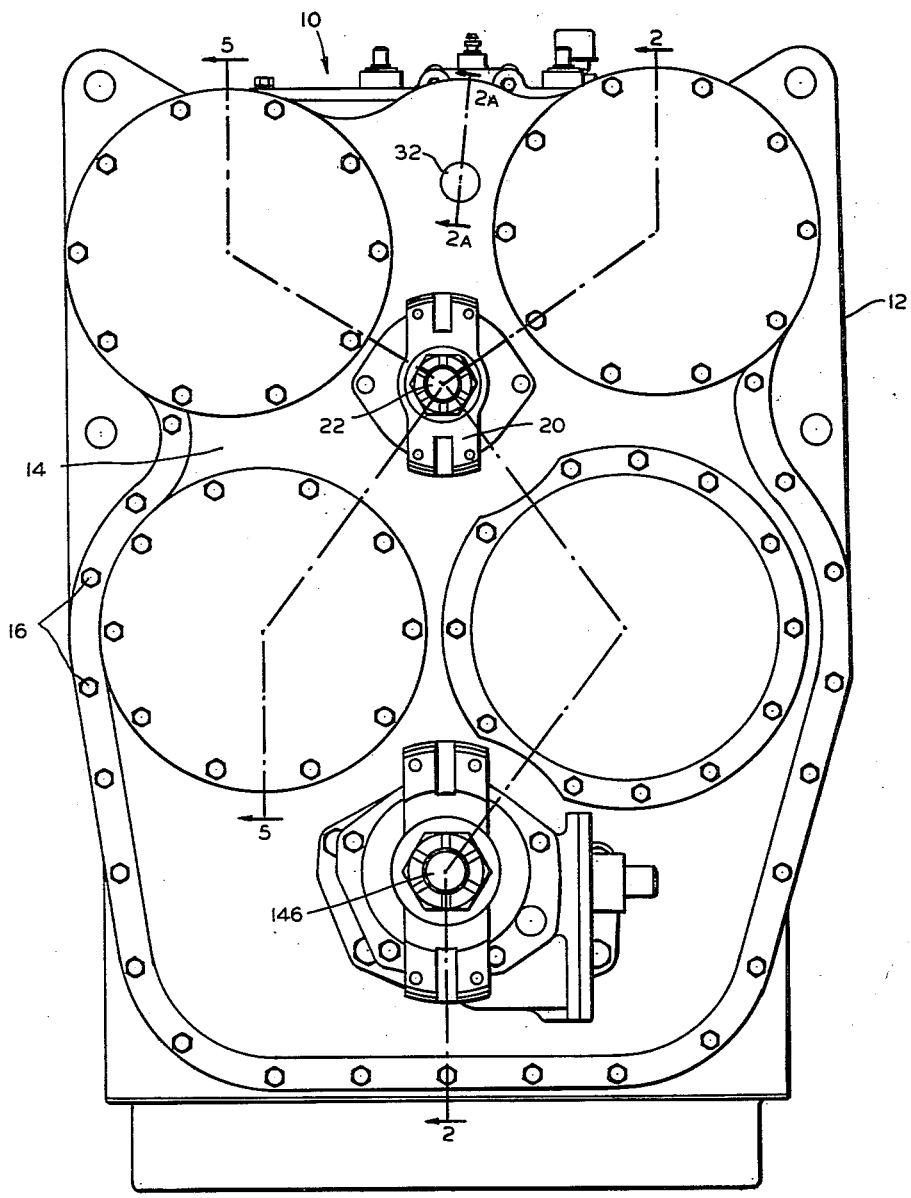
FIGURE 1 is a front end elevational view of a transmission according to the present invention having an offset output shaft.
Figure 2:
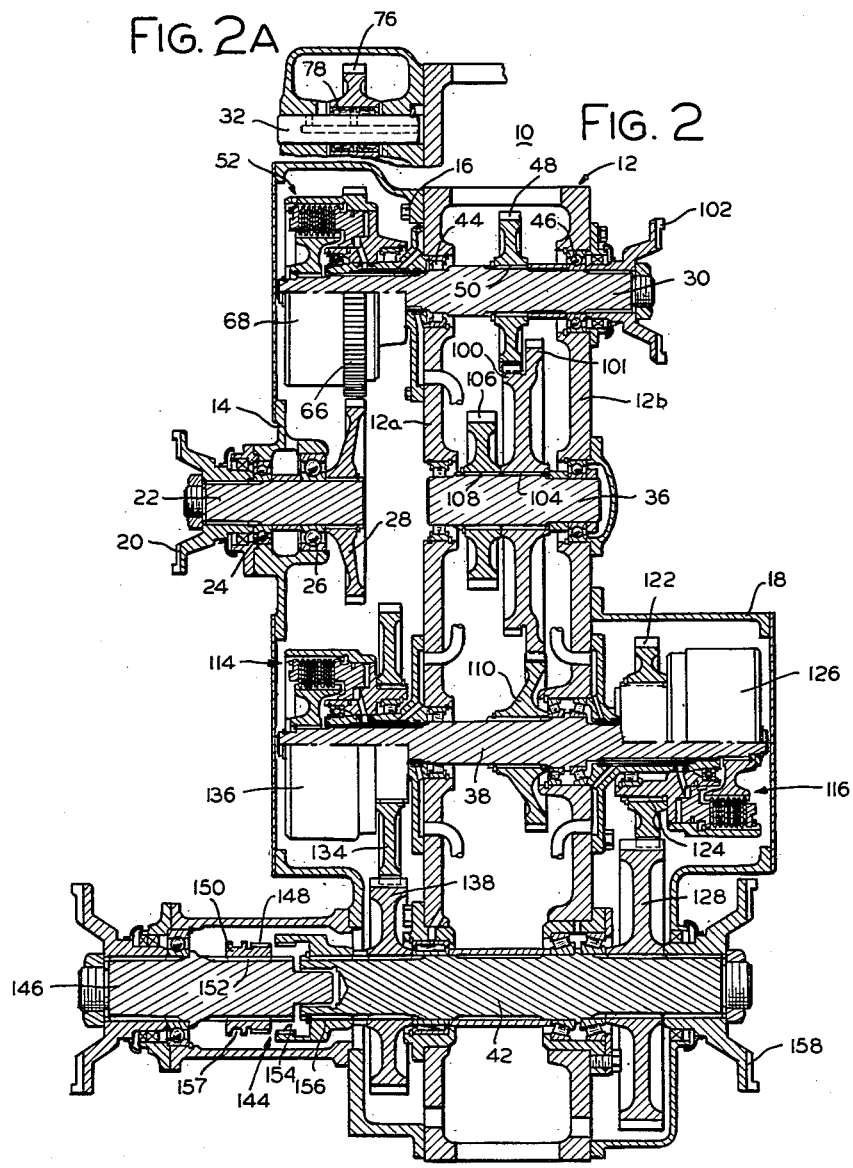
FIGURE 2 is a side elevational view in section along the line 2—2 of FIG. 1.
Figure 3:
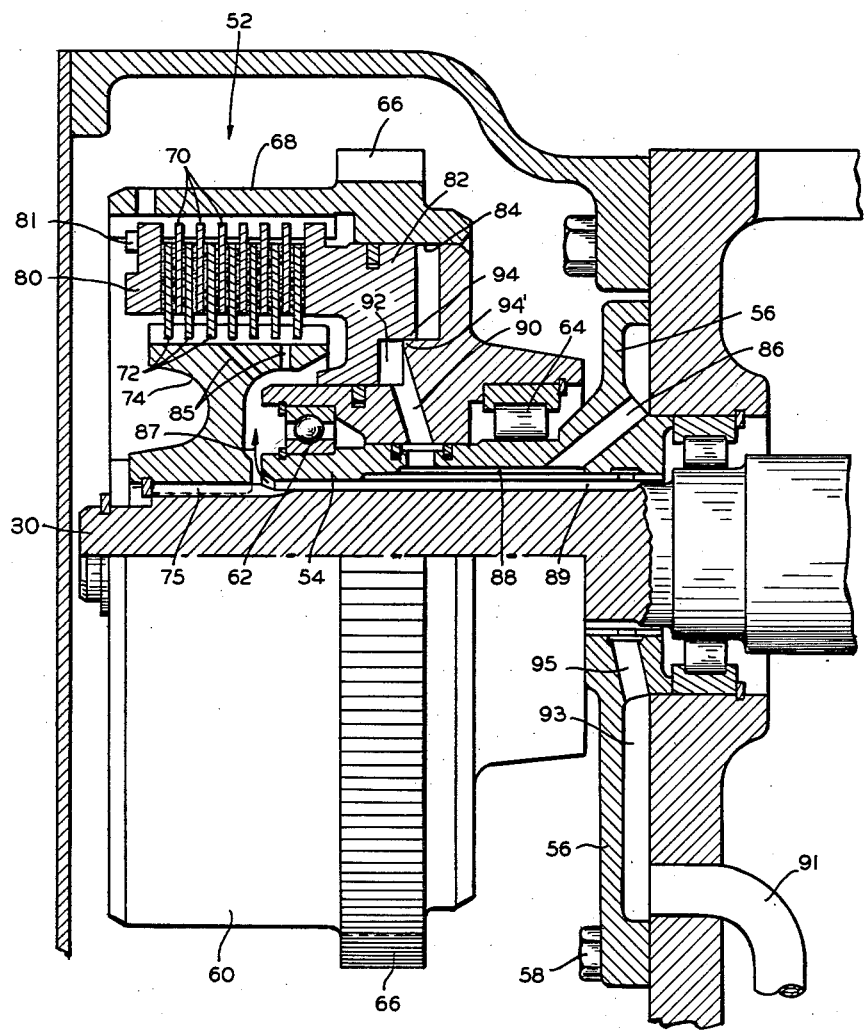
FIGURE 3 is an enlarged fragmentary view of a portion of FIG. 2.

Referring to the drawing, I have indicated generally by the numeral 10 a transmission embodying the present invention. The numeral 12 identifies the main casing or structural portion of the transmission which provides the principal support for the shafts, gears, clutches and other parts; and as seen in FIGS. 2 and 3 the principal front and rear walls of the casing are identified by the characters 12a and 12b respectively. The numeral 14 on the drawing indicates a housing or cover for gears and clutches which are mounted forwardly of casing wall 12a, the cover being secured to wall 12a in a suitable manner such as by a plurality of machine screws 16. Another clutch cover or housing 18 is secured on the rear wall 12b of casing 12.

The numeral 20 indicates a portion of a coupling device which is mounted at the forward end of input shaft 22. The coupling device portion 20 connects to a similar coupling portion on an engine or other source of power. The shaft 22 is journaled for rotation in housing 14 by means of a pair of ball bearing assemblies 24 and 26. An input gear 28 is secured to shaft 22.

In the form of FIGS. 1–4 inclusive, the transmission includes in addition to the input shaft 22 a reverse shaft 30, a non-rotatable idler shaft 32, a forward shaft 34 (see FIG. 4), a transfer shaft 36, a pair of intermediate shafts 38 and 40 (see FIG. 4) and an output shaft 42. Except for the idler shaft 32, all of these shafts project through and are journaled for rotation in the forward and rear walls 12a and 12b of the casing 12.

The reverse shaft 30 is journaled in the front wall 12a by means of a roller bearing assembly 44 and in the rear wall by means of a ball bearing assembly 46. The shaft 30 has a gear 48 secured thereto intermediate the walls 12a and 12b in a suitable manner such as by splines at 50. Forwardly of wall 12a a clutch construction indicated generally by the numeral 52 is associated with reverse shaft 30.

Referring to FIG. 3, the clutch structure 52 includes a fixed annular sleeve or quill member 54 which is connected by means of a flange portion 56 thereon to the front surface of wall 12a of the casing in a suitable manner such as by a plurality of machine screws 58. A combined gear and clutch drum member 60 is journaled on the tubular portion of member 54 by means of antifriction bearings shown as a ball bearing assembly 62 and a roller bearing assembly 64. As shown, a gear 66 is formed integrally on the outer surface of the clutch drum which is indicated separately by the numeral 68. The drum 68 carries a plurality of annular friction discs 70 which are splined to the clutch drum for rotation therewith. Interleaved between the friction discs 70 are alternate annular friction discs 72 which are splined to a hub member 74 which in turn is splined at 75 to shaft 30 for rotation therewith.

Referring to FIGS. 2 and 2a, gear 66 is in constant mesh with an idler gear 76 which is rotatably mounted by means of needle bearings 78 on idler shaft 32. Gear 76 also is in mesh with input gear 28, therefore, when input shaft 22 and input gear 28 are rotated the gear 66 also rotates, in the same direction as input gear 28 by virtue of the intervening idler gear 76, and gear 66 produces rotation of drum 68.

Referring to FIG. 3, the clutch structure 52 includes a backing plate or ring 80 which is secured at the outer end of drum 68 in a suitable manner such as by a snap-ring 81. The clutch 52 is applied by compressing the stack of discs 70, 72, and this is accomplished by an annular piston member 82. The piston 82 is mounted for axial movement in a chamber 84 which is formed inside drum 68. The piston is moved by fluid under pressure which is admitted through a slanted passageway 86 in member 54 to a longitudinal passageway 88 from which it passes through suitable sealing means to passageway 90 in the drum member and thence into chamber 84 to the right of piston 82. The fluid enters initially a portion 92 of the chamber which is cut off from the main portion of the chamber by shoulder portion 94 on the piston 82 until the piston has moved a short distance to the left and the shoulder portion 94 on the piston has passed a shoulder portion 94' on the drum member after which the full end area of the piston 82 is exposed to pressurized fluid. The effect of the structure and operation just described is that the piston moves rapidly in the initial stages of clutch engagement but with a relatively small force because the fluid is acting only on a portion of the end of the piston, but as fluid is admitted to the entire end surface of the piston it moves more slowly but with greater force which insures complete clutch engagement and lack of slippage during operation. It will be appreciated by those familiar with clutches of this type that a smooth transition may be provided between the two stages of clutch operation by controlled leakage or flow between shoulder portion 94 on the piston and shoulder portion 94' on the drum member prior to the time these parts separate axially from each other. Clutch disengagement is accomplished by closing a valve and removing the source of pressurized fluid from passageway 86 whereupon retracting springs (not shown) located between backing plate 80 and the piston 82 restore the piston 82 to its clutch disengaged position. When clutch 52 is engaged the reverse gear 48 on shaft 30 is, of course, driven by the input gear 28 through idler gear 76.

For cooling the clutch during the time when it is not engaged and there is relative motion between the interleaved friction discs, a longitudinal passageway 89 is provided to which cooling fluid is supplied under pressure through a conduit 91 and chamber 93 and passage 95 in the bearing cap 56. From annular passageway 89 the cooling fluid flows as indicated by the arrow 87 outwardly through openings 85 in hub 74 over the clutch discs.

Pressurized fluid is supplied both for cooling the clutches and for actuating them as described previously from a system of known type not shown herein which includes a suitable pump, pressure regulating means, control valves and conduits.

Figure 4:
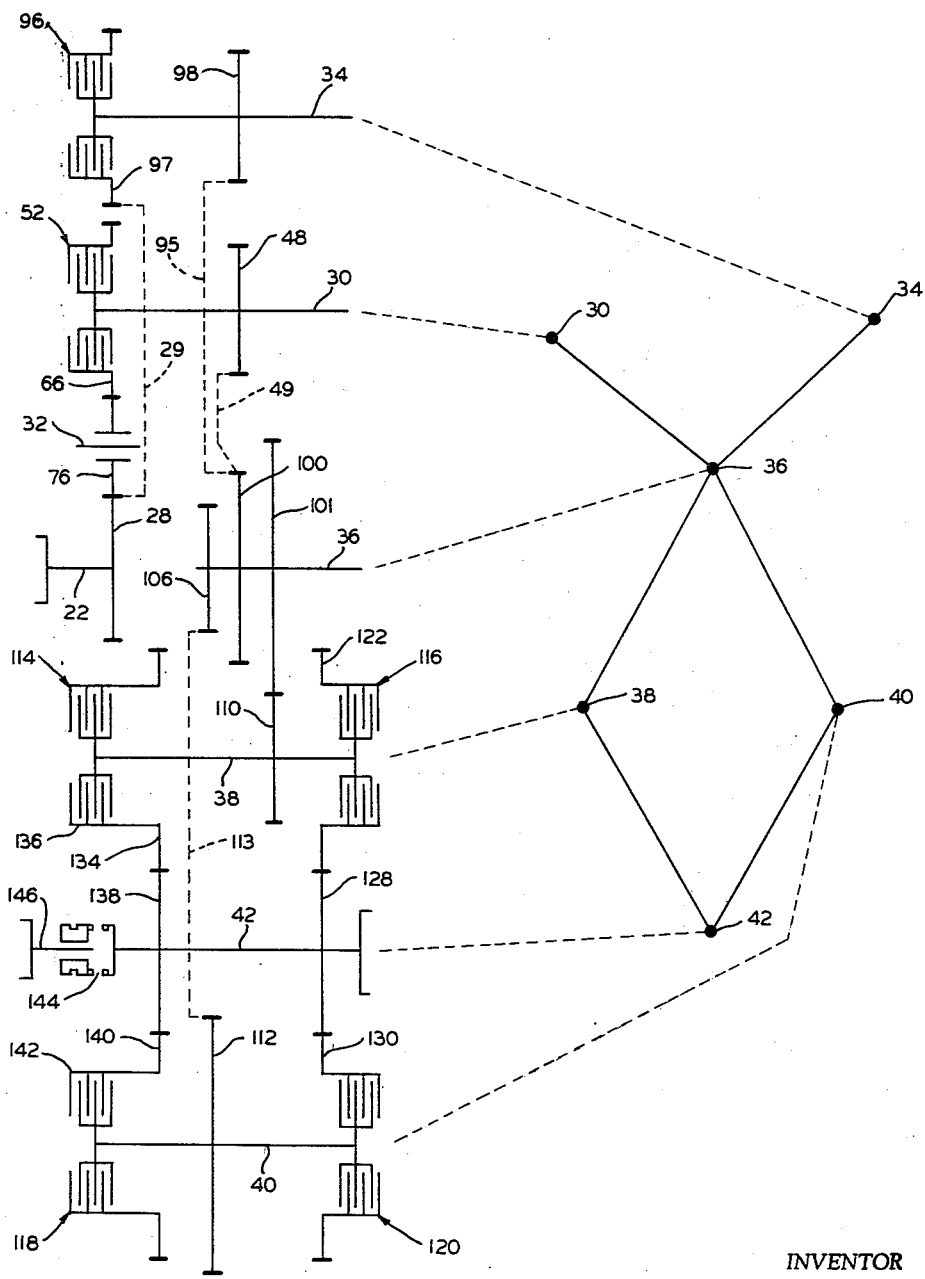
FIGURE 4 is a two-part diagrammatic representation of the transmission of FIGS. 1—3, showing a developed schematic diagram on the left of the gears, shafts and clutches in which all the shaft center lines are in one plane and on the right a diagram which shows the actual positions of the shafts as viewed from the rear of the transmission.
Figure 6:
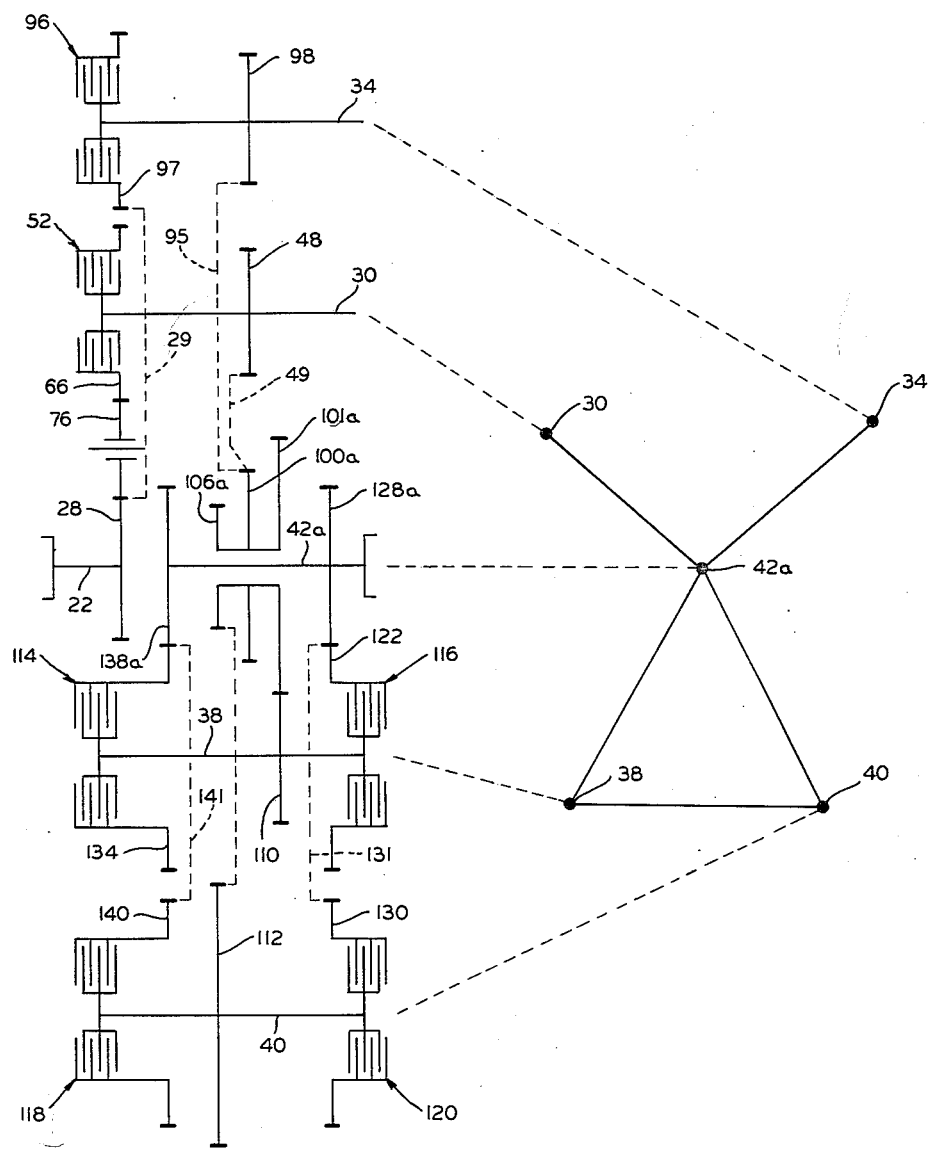
FIGURE 6 is a two-part diagrammatic representation of the same type as FIG. 4 but showing the transmission arrangement of FIG. 5.
Figure 7:
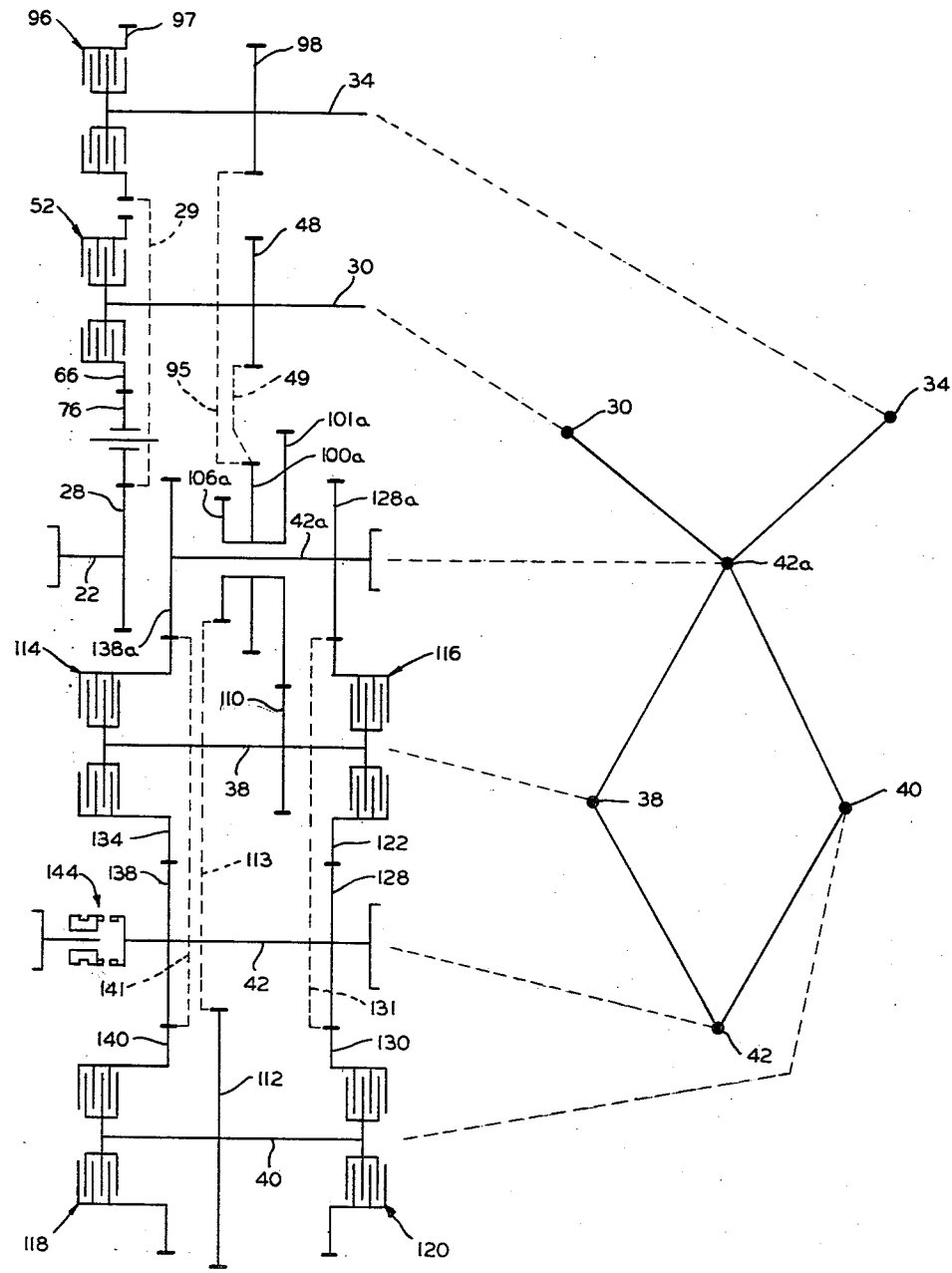
FIGURE 7 is a two-part diagrammatic representation of a transmission which includes two output shafts, one in alignment with the input shaft and one offset therefrom.

While the forward shaft 34 and its clutch 96 are not shown in detail, they are almost identical with the structure described hereinbefore for the reverse shaft 30 and clutch 52; the forward shaft 34 and its clutch 96 are shown schematically in FIG. 4. It will be appreciated that FIG. 4 and also FIGS. 6 and 7 each is in two parts. On the left in each of these figures is shown a developed schematic view of the gears, shafts and clutches with all of the shafts shown with their centers in the same plane and the various gears which are in mesh shown in contact with each other except in those cases where parts rotated out of position makes it impossible in which case the meshing gears are indicated by suitable dashed lines as explained in detail in connection with each figure. The right portion of each of FIGS. 4, 6 and 7 is a diagram showing the actual location of each of the shaft centers looking toward the transmission from the rear. A clutch gear 97 which is carried by the drum of the forward clutch 96 is in mesh with the input gear 28, as indicated by the dashed line 29 in FIG. 4, and therefore rotates continuously when gear 28 is rotating. Forward gear 98 on forward shaft 34 is in mesh with a gear 100, as indicated by the dashed line 95, with which the reverse gear 48 also is in mesh (as indicated by the dashed line 49 in FIG. 4). Thus gear 100 may be operated selectively in either direction depending on whether the reverse or forward clutch is engaged. As shown in FIG. 2, gear 100 and another gear 101, which is described in greater detail hereinafter, may be combined if desired. In any event gears 100 and 101 are connected together for conjoint rotation.

At the rearward end of reverse shaft 30 there is provision for a power take-off, that is, means in addition to the regular output shaft described hereinafter for driving an auxiliary implement or device. This comprises a portion 102 of a coupling which may be used to connect the auxiliary implement or device for operation by reverse shaft 30.

In the embodiment of the inventon shown in FIGS. 1–4 inclusive the gear 100 is secured to transverse shaft 36 in a suitable manner such as by splines at 104 and rotates this shaft. Also secured to shaft 36 is a gear 106, and this gear likewise may be splined at 108 to the shaft. The gear 101, which is combined with gear 100, is in constant mesh with a gear 110 which is secured to intermediate shaft 38. Gear 106 is in constant mesh with a gear 112 which is secured to intermediate shaft 40, and this is indicated by the dashed line 113 in FIG. 4.

At the ends of intermediate shaft 38 are a pair of clutches 114 and 116 respectively which are the same in design as clutch 52 described in detail previously so that it is unnecessary to describe these clutches in detail. Clutches 114 and 116 are larger than clutch 52 and they differ somewhat in operation in that the shaft 38 normally is the driving member and the clutches are utilized to connect this driving member to other driven gears mounted on the clutch drums, whereas in clutch 52 the drum 68 is the driven member and is connected by the clutch to the shaft. Similarly, clutches 118 and 120 are located respectively at the front and rear ends of intermediate shaft 40.

A gear 122 is secured in a suitable manner such as by splines at 124 to the drum 126 of clutch 116. Gear 122 is in constant mesh with a gear 128 which is splined or otherwise secured to output shaft 42. Similarly a gear 130 connected to the clutch drum of clutch 120 is in constant mesh with gear 128 on the output shaft. A gear 134 is mounted for rotation by drum 136 of clutch 114, and gear 134 is in constant mesh with a gear 138 which is splined or otherwise secured to output shaft 42. Similarly a gear 140 is secured to clutch drum 142 of clutch 118 and is in constant mesh with gear 138. It will be appreciated that with the gear and clutch arrangement just described it is possible to select any one of four gear ratios for the operation of output shaft 42 when transfer shaft 36 is in operation. When transfer shaft 36 is turning, both intermediate shafts 38 and 40 also turn continuously through gears 101, 110 and 106, 112 respectively. From each intermediate shaft either of two ratios can be selected by operating the clutch at one end of the shaft or the other. The transfer shaft can be operated selectively in either direction as explained previously by engaging either the forward clutch or the reverse clutch, thus this transmission provides for the rotation of output shaft 42 from input shaft 22 in either direction at any one of four different gear ratios.

As may be seen in FIG. 2, a tooth clutch mechanism 144 is provided for selectively connecting a stub shaft 146 to output shaft 42 when it is desired to provide drive forwardly as well as rearwardly from the transmission. Clutch mechanism 144 includes teeth 148 on a collar 150 which is splined at 152 or otherwise secured to shaft 146 for rotation therewith. Arranged to mate with the teeth 148 are teeth 154 on a collar member 156 which is secured to shaft 42. The collar 150 is slidable axially to the right by a shifter mechanism, not shown, which engages in the groove 157 in collar 150 in a known manner to engage the clutch 144. When this transmission is installed in a vehicle the shaft 146 is clutched to shaft 42 when it is desired to provide the vehicle with four-wheel drive, but when only two-wheel drive is desired, the shaft 146 is disconnected by shifting the collar 150 to the left again and the sole main drive is provided by shaft 42 through a coupling portion 158 at the rearward end thereof.

In a typical transmission according to the form of this invention disclosed hereinbefore the various gears may have the numbers of teeth set forth in the following tabulation.

| Gears: | No. of Teeth |
| --- | --- |
| 28 | 48 |
| 76 | 30 |
| 66 | 49 |
| 97 | 49 |
| 48 | 38 |
| 98 | 34 |
| 100 | 64 |
| 101 | 77 |
| 106 | 34 |
| 110 | 41 |
| 112 | 63 |
| 122 | 41 |
| 130 | 41 |
| 134 | 67 |
| 140 | 67 |
| 128 | 57 |
| 138 | 50 |

The foregoing gears provide for gear ratios of 4.94:1, 2.64:1, 1.42:1 and 0.76:1 in forward drive when the clutch 96 and one of the clutches 120, 118, 116 and 114 respectively are engaged. In reverse, when clutch 52 is engaged, the ratios are 4.40:1, 2.35:1, 1.265:1 and .677:1 when the clutches 120, 118, 116 and 114 respectively are engaged.

Figure 5:
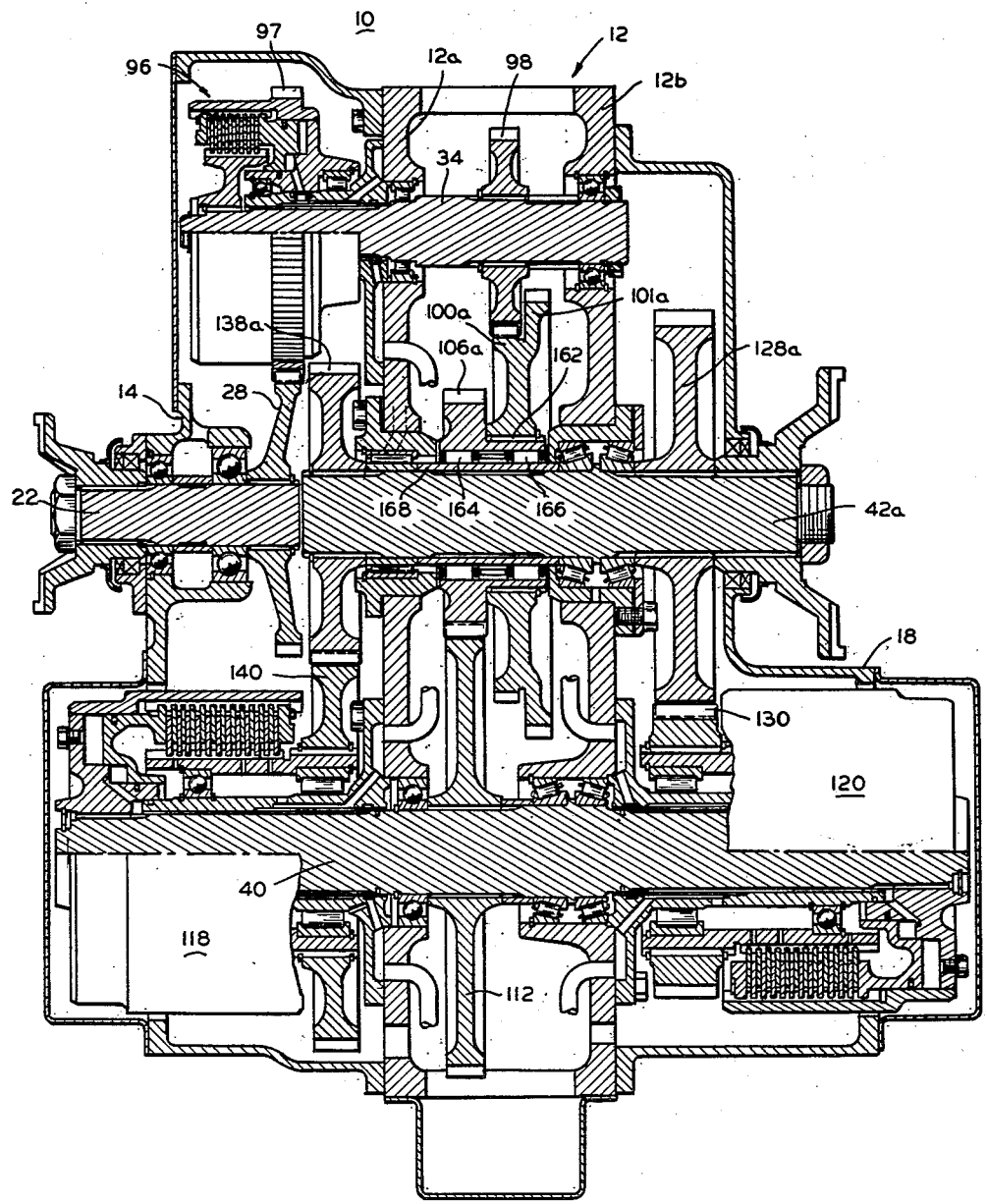
FIGURE 5 is a side elevational view in section similar to FIG. 2 (except along line 5—5 of FIG. 1) showing the transmission with the output shaft aligned with the input shaft.

FIGS. 5 and 6 of the drawing show another form of the invention which is the same as the first form in most respects but differs in that the output shaft, indicated in these figures by the character 42a, is located in alignment with the input shaft 22. This is accomplished by utilizing instead of the transfer shaft 36 and gears thereon of the first form a gear structure which is rotatably mounted coaxially with the output shaft 42a. I have indicated such gears in FIGS. 5 and 6 by the identifying characters 100a, 101a and 106a, these characters indicating the gears which correspond to gears 100, 101 and 106 respectively of the first form. Gears 106a, 101a are secured together in a suitable manner such as by splines at 162 (see FIG. 5), and the resulting structure is journaled by suitable anti-friction bearing means such as roller bearing assemblies 164 and 166 on a rotatable sleeve member 168 which rotates with shaft 42a.

The other parts of this form of the invention correspond to the first form and bear the same identifying characters; however, the gears on the output shaft are indicated by the characters 128a and 138a. The gear 128a is in constant mesh with gear 122 and with gear 130 as indicated by dashed line 131, and gear 138a is in mesh with gear 134 and with gear 140 as indicated by dashed line 141. Thus this transmission operates the same as the first form except that the output shaft 42a is in alignment with input shaft 22, and of course there is no provision in this form for an optional drive toward the front of the transmission.

It is possible also to utilize this invention with output shafts at both locations of the two embodiments described hereinbefore, and such a transmission is illustrated diagrammatically in FIG. 7 of the drawing.

It will be appreciated from the foregoing that the transmission of this invention fulfills the objects stated previously. It provides a transmission in which the output shaft may be in alignment with the input shaft or offset therefrom, or, if desired, it is possible to have the output shafts in both of these locations.

This invention also provides a transmission in which it is necessary to disengage and to engage only one clutch at a time in order to accomplish a change in gear ratio.

This invention further provides the advantage of making it possible to utilize the same part or subassembly in more than one location in the transmission in many cases which, of course, means that in manufacturing such transmissions it is possible to make a larger quantity of a smaller number of different parts. This facilitates manufacture and decreases costs. For example, the two clutch assemblies 52 and 96 are identical. Similarly, clutches 118 and 120 are identical to each other as are clutches 114 and 116. It will be observed too from the foregoing tabulation of gears that many of the gears are duplicated in the transmission.

Another feature of this invention is that it is possible readily to change gear ratios in many places without altering any part of the transmission except the gears directly involved.

While I have illustrated and described herein certain preferred embodiments of my invention, it will be apparent that modifications may be made by those skilled in the art. It should be understood therefore that I intend to cover by the appended claims all such modifications which fall within the true spirit and scope of my invention.

I claim:

1. A multi-ratio change speed transmission providing four drive ratios in each direction and comprising, six rotatable shafts arranged in parallel relation including an input shaft, a reverse shaft, a forward shaft, a pair of intermediate shafts and an output shaft, a first clutch located at one end of the said reverse shaft, a second clutch located at the same end of the said forward shaft, four ratio clutches located respectively at the ends of the said two intermediate shafts, each of the said six clutches including a hub connected to the respective shaft and carrying a plurality of friction disc members and a drum rotatable around the shaft and carrying a plurality of friction discs interleaved with the said friction discs on the hub and means for compressing the assembly of interleaved friction discs for clutching each drum to its respective shaft, a reverse gear carried by the reverse shaft clutch drum, means including an input gear on the said input shaft and an idler gear for driving the said reverse gear from the said input shaft, a forward gear carried by the forward shaft clutch drum and in mesh with the said input gear, a forward drive gear carried by the said forward shaft for rotation therewith, a reverse drive gear carried by the said reverse shaft for rotation therewith, a first transfer gear rotatable around the said output shaft and in mesh with the said forward drive gear and the said reverse drive gear, a second transfer gear secured to the said first transfer gear for rotation therewith and in mesh with a first intermediate gear secured to one of the said intermediate shafts, a third transfer gear secured to the said first transfer gear for rotation therewith and in mesh with a second intermediate gear carried by the other intermediate shaft, the said transfer gears being disposed coaxially with said input shaft, four ratio gears carried respectively by the four clutch drums on the said intermediate shafts, a first output gear secured to the said output shaft and in constant mesh with two of the said ratio gears one on each of the said intermediate shafts at one end of the intermediate shafts, and a second output gear secured to the said output shaft and in constant mesh with the other two said ratio gears.

2. A multi-ratio change speed transmission comprising, seven rotatable shafts arranged in parallel relation including an input shaft, a reverse shaft, a forward shaft, two intermediate shafts and two output shafts, a first clutch located at one end of the said reverse shaft, a second clutch located at the same end of the said forward shaft, four ratio clutches located respectively at the ends of the said two intermediate shafts, each of the said six clutches including a hub connected to the shaft and carrying a plurality of friction disc members and a drum rotatable around the shaft and carrying a plurality of friction discs interleaved with the said friction discs on the hub and means for compressing the assembly of interleaved friction discs for clutching each drum to its respective shaft, a reverse gear carried by the reverse shaft clutch drum, means including an input gear on the input shaft and an idler gear for driving the said reverse gear from the said input shaft, a forward gear carried by the forward shaft clutch drum and in mesh with the said input gear, a forward drive gear carried by the said forward shaft for rotation therewith, a reverse drive gear carried by the said reverse shaft for rotation therewith, a first transfer gear mounted for rotation around one of the said output shafts and in mesh with the said forward drive gear and the said reverse drive gear, a second transfer gear secured to the said first transfer gear for rotation therewith and in mesh with a first intermediate gear secured to one of the said intermediate shafts, a third transfer gear secured to the said first transfer gear for rotation therewith and in mesh with a second intermediate gear carried by the other intermediate shaft, the said transfer gears being disposed coaxially with said input shaft, four ratio gears carried respectively by the four clutch drums on the said intermediate shafts, a first pair of output gears secured respectively to the said two output shafts and both in constant mesh with two of the said ratio gears one on each of the said intermediate shafts at one end of the intermediate shafts, and a second pair of output gears secured to the two output shafts respectively and both in constant mesh with the other two said ratio gears.

3. A power transmission including an input shaft, a forward shaft, a reverse shaft, a pair of intermediate shafts and an output shaft, all of the said shafts rotatably mounted in a vertically disposed supporting structure in parallel relationship with each other, the said input shaft being at an intermediate location, the said forward and reverse shafts above the said input shaft, the said output shaft in alignment with the said input shaft and the said pair of intermediate shafts below the said input and output shafts, constant mesh forward and reverse gear means including transfer gear means disposed coaxially with said input shaft and rotatable around the said output shaft interconnecting the said input shaft and the said forward and reverse shafts with both of the said intermediate shafts, constant mesh change speed gear means interconnecting both of the said intermediate shafts with the said output shaft, six multiple disc friction clutches located one at an end of the said forward shaft, another at the same end of the said reverse shaft, and the other four respectively at the opposite ends of both of the said intermediate shafts, each of the said clutches including a hub secured to the respective shaft and carrying a plurality of friction discs and a rotatable drum on the shaft carrying a plurality of friction discs interleaved with the first mentioned friction discs, and means for selectively engaging the said clutches in pair for driving the output shaft at any of four different ratios in either direction of rotation relative to the said input shaft.

4. A power transmission including an input shaft, a forward shaft, a reverse shaft, a pair of intermediate shafts and a pair of output shafts, all of the said shafts rotatably mounted in a vertically disposed supporting structure in parallel relationship with each other, the said input shaft being at an intermediate location, the said forward and reverse shafts above the said input shaft, one of the said output shafts in alignment with the said input shaft, the said pair of intermediate shafts below the said one output shaft, and the other output shaft below the said pair of intermediate shafts, constant mesh forward and reverse gear means including transfer gear means disposed coaxially with said input shaft and rotatable around the said one output shaft connecting the said input shaft and the said forward and reverse shafts with both of the said intermediate shafts, constant mesh change speed gear means interconnecting both of the said intermediate shafts with both of the said output shafts, six multiple disc friction clutches located one at an end of the said forward shaft, another at the same end of the said reverse shaft, and the other four respectively at the opposite ends of both of the said intermediate shafts, each of the said clutches including a hub secured to the respective shaft and carrying a plurality of friction discs and a rotatable drum on the shaft carrying a plurality of friction discs intereleaved with the first-mentioned friction discs, and means for selectively engaging the said clutches in pairs for driving both of the said output shafts in any of four different ratios in either direction of rotation relative to the said input shaft.

5. In a transmission, forward and rear vertically disposed walls having a plurality of pairs of aligned openings in the respective walls, an input shaft, an output shaft and a pair of intermediate shafts, all of the said shafts rotatably mounted in parallel relationship with each other and the said output shaft and the said intermediate shafts extending through the said walls through the said aligned pairs of openings, constant mesh forward and reverse gear means located at least partly outside the said walls interconnecting the said input shaft with both of the said intermediate shafts, said gear means including transfer gears disposed coaxially with said input shaft, constant mesh change speed gear means located outside the walls interconnecting both of the said intermediate shafts with the said output shaft, and engageable and disengageable friction clutch means located outside the said walls for selectively engaging the said change speed gearing for driving the said output shaft at preselected ratios relative to the said input shaft.

6. In a transmission, forward and rear vertically disposed walls having a plurality of aligned openings in the two said walls, an input shaft, a transfer shaft disposed coaxially with said input shaft, a pair of intermediate shafts and an output shaft, all of the said shafts rotatably mounted in parallel relationship with each other and the said transfer shaft, the said intermediate shafts and the said output shaft extending through the said walls through the said aligned pairs of openings, constant mesh forward and reverse gear means located at least partly outside the said walls interconnecting the said input shaft with the said transfer shaft and with both of the said intermediate shafts, constant mesh change speed gear means located outside the said walls interconnecting both of the said intermediate shafts with the said output shaft, and engageable and disengageable friction clutch means located outside the said walls including a first pair of identical clutches associated with one of the said intermediate shafts and a second pair of identical clutches associated with the other intermediate shaft for selectively engaging the said change speed gearing for driving the said output shaft at the desired ratio relative to the said input shaft.

7. In a transmission, a casing having forward and rear vertically disposed walls provided with a plurality of pairs of aligned openings through the two walls, a plurality of shafts including a forward shaft, a reverse shaft, an output shaft and a pair of intermediate shafts, all of the said shafts rotatably mounted in parallel relationship with each other and extending through the said walls through the said aligned pairs of openings, constant mesh forward and reverse gear means including transfer gears coaxial with said input shaft and coaxial with and rotatable around the said output shaft interconnecting the said forward and reverse shafts with both of the said intermediate shafts, constant mesh change speed gear means located outside the said walls interconnecting both of the said intermediate shafts with the said output shaft, and engageable and disengageable friction clutch means located outside the said walls including a first pair of identical clutches associated with one of the said intermediate shafts and a second pair of identical clutches associated with the other intermediate shaft for selectively engaging the said change speed gearing for driving the said output shaft at a preselected ratio.

8. In a transmission, forward and rear vertically disposed walls having a plurality of pairs of aligned openings in the two walls, a plurality of shafts including a forward shaft, a reverse shaft, two output shafts and a pair of intermediate shafts, all of the said shafts rotatably mounted in parallel relationship with each other and extending through the said walls through the said aligned pairs of openings, constant mesh forward and reverse gear means interconnecting the said forward and reverse shafts with both of the said intermediate shafts, the said forward and reverse gear means including transfer gears coaxial with said input shaft and coaxial with and rotatable about one of the said output shafts, constant mesh change speed gear means located outside the said walls interconnecting both of the said intermediate shafts with both of the said output shafts, and engageable and disengageable friction clutch means located outside the said walls including a first pair of identical clutches associated with one of the said intermediate shafts and a second pair of identical clutches associated with the other intermediate shaft for selectively engaging the change speed gearing for driving the said output shafts at a preselected ratio.

References Cited in the file of this patent

UNITED STATES PATENTS

| | | |
|---|---|---|
| 2,192,790 | Havill | Mar. 5, 1940 |
| 2,633,754 | Gerst | Apr. 7, 1953 |
| 2,866,360 | Gerst et al. | Dec. 30, 1958 |
| 2,867,126 | Bolster | Jan. 6, 1959 |
| 2,972,901 | Gerst | Feb. 28, 1961 |

FOREIGN PATENTS

| | | |
|---|---|---|
| 804,134 | France | Oct. 16, 1936 |